US012627678B2

(12) United States Patent
Naka et al.

(10) Patent No.: US 12,627,678 B2
(45) Date of Patent: May 12, 2026

(54) ABNORMALITY DETECTING DEVICE, SECURITY SYSTEM, AND ABNORMALITY NOTIFICATION METHOD

(71) Applicant: Nissan Motor Co., Ltd., Kanagawa (JP)

(72) Inventors: Ken Naka, Kanagawa (JP); Satoru Matsuyama, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 88 days.

(21) Appl. No.: 18/290,589

(22) PCT Filed: Jul. 21, 2021

(86) PCT No.: PCT/JP2021/027417
§ 371 (c)(1),
(2) Date: Jan. 19, 2024

(87) PCT Pub. No.: WO2023/002634
PCT Pub. Date: Jan. 26, 2023

(65) Prior Publication Data
US 2024/0259399 A1     Aug. 1, 2024

(51) Int. Cl.
*H04L 9/40*          (2022.01)

(52) U.S. Cl.
CPC ...... *H04L 63/1416* (2013.01); *H04L 63/1425* (2013.01); *H04L 63/1458* (2013.01)

(58) Field of Classification Search
None
See application file for complete search history.

(56) References Cited

U.S. PATENT DOCUMENTS

| | | | |
|---|---|---|---|
| 11,128,657 B2 | 9/2021 | Kishikawa et al. | |
| 11,838,314 B2 | 12/2023 | Kishikawa et al. | |
| 2017/0233000 A1* | 8/2017 | Fujimoto | G06F 3/0656 |
| | | | 701/41 |
| 2018/0141439 A1 | 5/2018 | Shin | |
| 2019/0050354 A1 | 2/2019 | Murata et al. | |

(Continued)

FOREIGN PATENT DOCUMENTS

| | | |
|---|---|---|
| EP | 3720055 A1 | 10/2020 |
| JP | 2015-113002 A | 6/2015 |

(Continued)

*Primary Examiner* — Fatoumata Traore
(74) *Attorney, Agent, or Firm* — Osha Bergman Watanabe & Burton LLP

(57)          ABSTRACT

An abnormality detecting device includes a controller for detecting an abnormality occurred in an in-vehicle network in which a plurality of pieces of vehicle-mounted equipment mounted in a vehicle communicate with each other; and a storage device for storing information, the controller determines a data amount and/or a timing to be used for communication with an external device, based on a priority that is a degree of influence on a system based on a degree of security violation or a degree of gradually increasing risk from a history of the number of times a security violation signal has been acquired when the security violation signal is detected as the abnormality from acquired data, and communicates contents or a transmission destination of a data frame including the security violation signal if the priority is more than a first prescribed value.

12 Claims, 8 Drawing Sheets

(56) References Cited

U.S. PATENT DOCUMENTS

| | | | |
|---|---|---|---|
| 2019/0334897 A1 * | 10/2019 | Anzai | B60R 16/023 |
| 2019/0349394 A1 | 11/2019 | Kishikawa et al. | |
| 2021/0273966 A1 * | 9/2021 | Sasaki | H04L 63/1425 |
| 2021/0385244 A1 | 12/2021 | Kishikawa et al. | |
| 2023/0109507 A1 * | 4/2023 | Kim | B60R 25/30 |
| | | | 726/25 |
| 2023/0350714 A1 * | 11/2023 | Sekiya | G06Q 50/10 |
| 2024/0064169 A1 | 2/2024 | Kishikawa et al. | |

FOREIGN PATENT DOCUMENTS

| | | |
|---|---|---|
| JP | 2018-82410 A | 5/2018 |
| JP | 2018-146542 A | 9/2018 |
| JP | 2018-160786 A | 10/2018 |
| JP | 2019-36774 A | 3/2019 |

* cited by examiner

ABNORMALITY DETECTING DEVICE, SECURITY SYSTEM, AND ABNORMALITY NOTIFICATION METHOD

TECHNICAL FIELD

The present invention relates to an abnormality detecting device, a security system, and an abnormality notification method.

BACKGROUND ART

In recent years, various types of pieces of vehicle-mounted equipment such as Electronic Control Units (ECUs) are mounted on automobiles. The pieces of vehicle-mounted equipment are connected to each other via an in-vehicle network such as a Controller Area Network (CAN), and the pieces of vehicle-mounted equipment can cooperate with each other by communicating with each other. To prevent unauthorized access to vehicle-mounted equipment, an in-vehicle network is required to have high security.

For example, Patent Literature 1 discloses a communication system that enables high-speed and safe acquisition of diagnostic information obtained by collecting pieces of information transmitted and received between communication devices from the outside. Specifically, due to an output device outputting diagnostic information obtained via a high-speed trunk line to an external device, high-speed acquisition of the diagnostic information from the outside is enabled.

CITATION LIST

Patent Literature

[Patent Literature 1] Japanese Unexamined Patent Application Publication No. 2015-113002

SUMMARY OF THE INVENTION

Problems to be Solved by the Invention

However, according to the technology disclosed in Patent Literature 1, when the output device outputs the information to the external device, there is a problem that the amount of data required for communication with the external device increases, because all pieces of information stored in a storage device of a vehicle are output.

It is possible to suppress the amount of data required for communication with an external server by transmitting all pieces of detailed information stored in a storage device in a vehicle only when there is a request from the external server without normally outputting the all pieces of detailed information. However, if this kind of method is adopted, contents that the external server can know at normal times are limited and detailed information or the like that can be stored as a log is also limited. Therefore, it thought that a new abnormality is detected before the detailed information is transmitted to the external server, or if it takes time for the external server to make a determination, the log of the detailed information may be overwritten by a new log.

The present invention has been devised in consideration of the above problems, and an object of the present invention is to provide an abnormality detecting device, a security system, and an abnormality notification method capable of suppressing disappearance of a log such as detailed information before notification to an external server, by transmitting information indicating contents of an abnormality to the external server depending on a situation.

Means for Solving the Problem

An abnormality detecting device according to an aspect of the present invention includes: a controller (CPU 21) for detecting an abnormality occurred in an in-vehicle network in which a plurality of pieces of vehicle-mounted equipment mounted in a vehicle communicate with each other; and a storage device (storage unit 23) for storing information, in which the controller (CPU 21) determines a data amount and/or a timing to be used for communication with an external device (management server 100), based on a priority according to a type, contents, number of times, a frequency, a tendency, an amount of detection, a degree of influence, and/or a degree of risk of the detected abnormality, and communicates with the external device (management server 100) according to the data amount and/or the timing.

Advantageous Effect of the Invention

According to the present invention, by determining the amount and/or timing of notification of information indicating contents of an abnormality depending on a situation and transmitting information to an external server, it is possible to suppress disappearance of a log such as detailed information before notification to the external server.

BRIEF DESCRIPTION OF THE DRAWINGS

FIGS. 6A and 6B are an explanatory diagram showing a procedure of processing related to information reading or the like.

MODES FOR CARRYING OUT THE INVENTION

Figure 1:
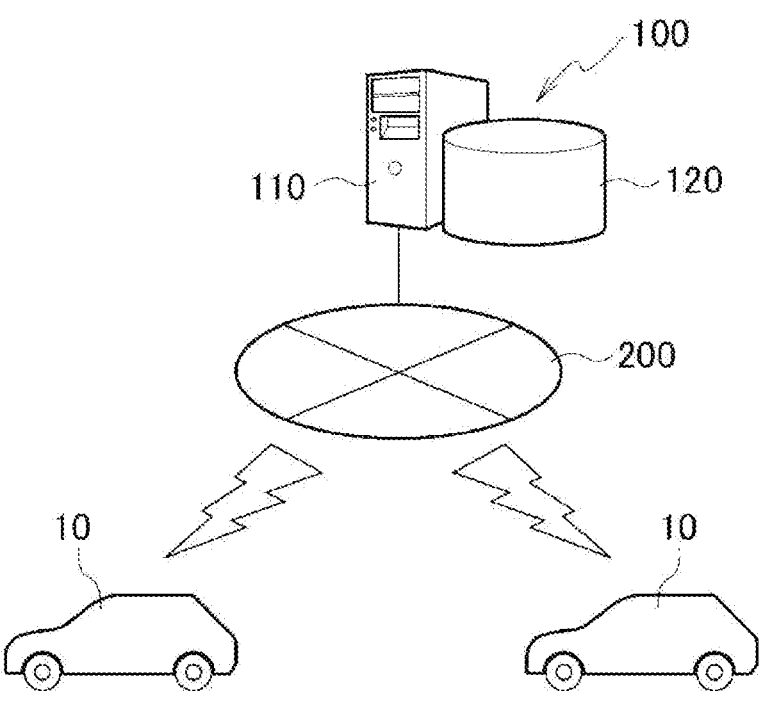
FIG. 1 is a diagram schematically showing a configuration of a security system according to the present embodiment.

An embodiment of the present invention will be described below with reference to the drawings. In the drawings, the same parts are denoted by the same reference numerals and the description thereof is omitted.

Figure 2:
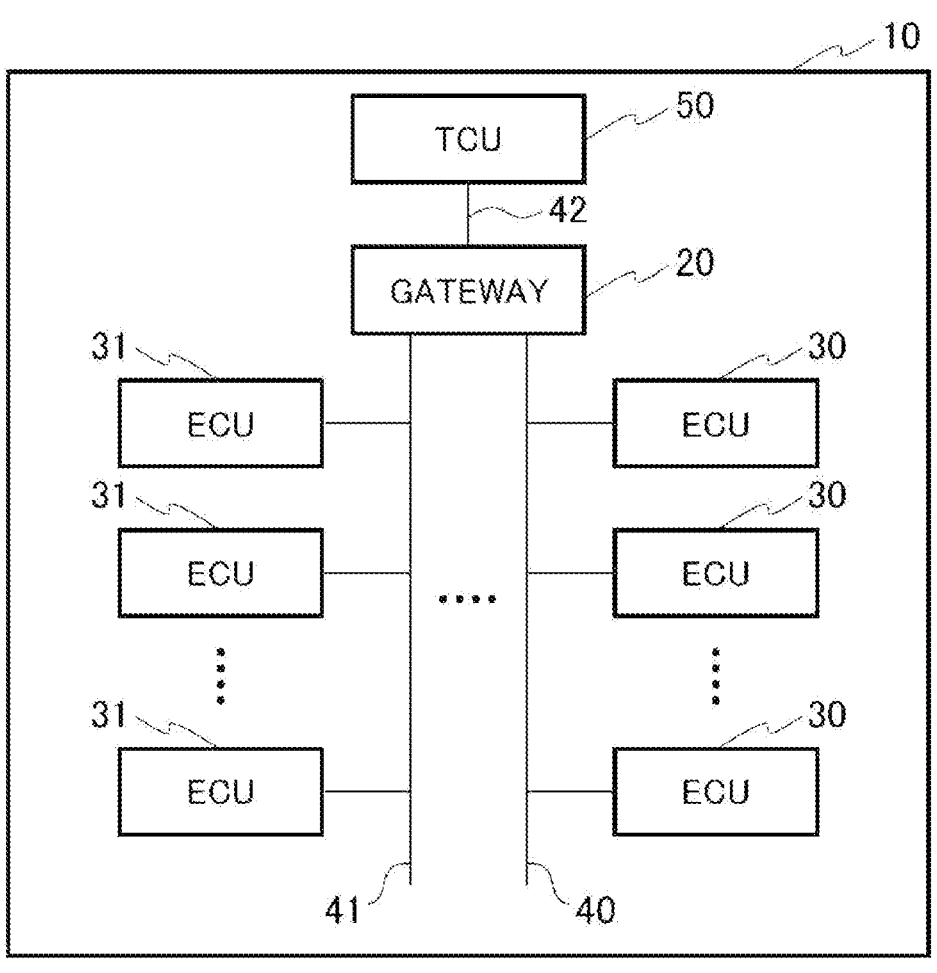
FIG. 2 is a block diagram showing a configuration of a vehicle according to the present embodiment.
Figure 3:
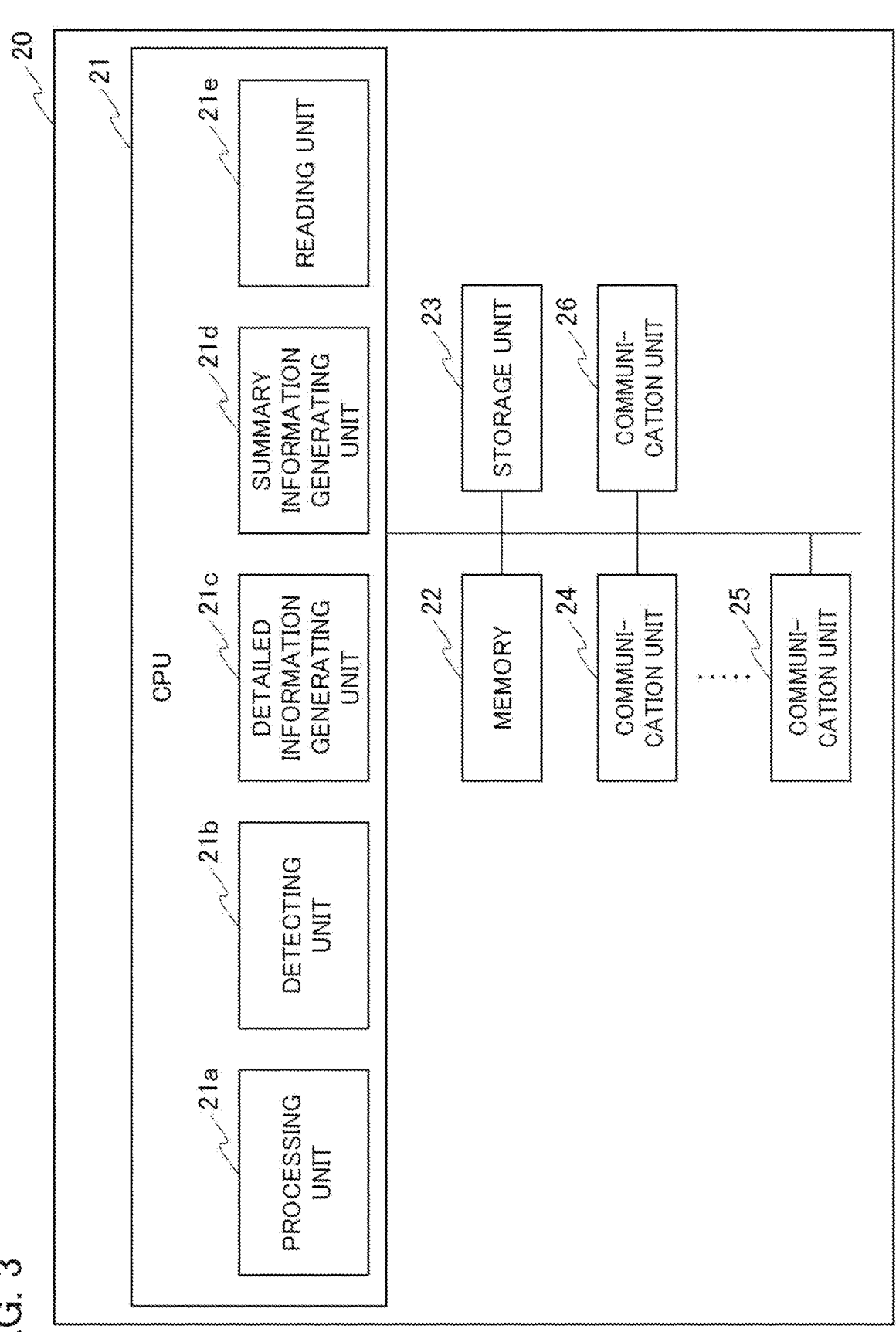
FIG. 3 is a block diagram showing a configuration of a gateway.

With reference to FIGS. 1 to 3, a configuration of a security system according to the present embodiment will be described. The security system manages an abnormality occurred in an in-vehicle network constructed in a vehicle.

The security system is mainly constituted by one or more vehicles 10 and a management server 100 as an external server device. Each vehicle 10 and the management server 100 are configured to be able to communicate with each other via an external network 200. An example of the external network 200 is a mobile communication network such as a cellular telephone network. However, the external network 200 may be the Internet or the like. In an example shown in FIG. 1, two vehicles 10 are shown, but the number of vehicles is not limited thereto.

Each vehicle 10 is mainly constituted by a gateway 20, a plurality of electronic control devices (ECUs) 30 and 31, and a telematics communication unit (TCU) 50. The gateway 20, the plurality of ECUs 30, and the TCU 50 are connected to communication buses 40, 41, and 42 and construct the in-vehicle network.

Specifically, the plurality of ECUs 30 are connected to the communication bus 40 such that the ECUs 30 can communicate with each other via the communication bus 40. The plurality of ECUs 31 are connected to the communication bus 41 such that the ECUs 31 can communicate with each other via the communication bus 41. Any number of ECUs 30 and 31 can be connected to the communication buses 40 and 41 depending on necessity of vehicle control. Further, the TCU 50 is connected to the communication bus 42. It goes without saying that a block configuration of each vehicle is not limited to this example (FIG. 2).

In the following description, it is assumed that the in-vehicle network is a Controller Area Network (CAN). However, the in-vehicle network may be a network that is compliant with a communication protocol other than the CAN, such as a Local Interconnect Network (LIN), FlexRay (registered trademark), or Ethernet (registered trademark). In addition, the in-vehicle network may encompass a plurality of networks that are compliant with different communication protocols.

The gateway 20 is connected to all of the communication buses 40, 41, and 42. The gateway 20 transfers communication data between the communication bus 40 and the communication bus 41, or transfers communication data between the communication bus 42, and the communication bus 40 or the communication bus 41.

Further, the gateway 20 functions as an abnormality detecting device that detects a security abnormality such as an attack on the in-vehicle network and notifies the management server 100 of the security abnormality. The gateway 20 is realized using an electronic control device (ECU).

Each of the ECUs 30 and 31 is an electronic control device including a microprocessor, a ROM, a RAM, an input/output interface, and the like. Components or sensors of each vehicle 10 are connected to the ECUs 30 and 31. The ECUs 30 and 31 perform various controls based on detected values of sensors and states of components.

The ECUs 30 and 31 include an ECU for controlling an operation of a powertrain including an engine, an ECU for controlling a transmission, an ECU for controlling an electrical component, and the like. Further, the ECUs 30 and 31 include an ECU for performing control for a navigation system, an ECU for performing control for safe traveling and automatic traveling, and the like. The ECUs 30 and 31 include various ECUs in accordance with functions and usage applications.

The TCU 50 is a communicating unit that communicates with another vehicle 10 or an external device (including the management server 100) outside a vehicle through the external network 200. The TCU 50 is also implemented using an electronic control device (ECU). The TCU 50 may be an Inter-Vehicle Communication (IVC) system.

The TCU 50 transfers information transmitted from an external device or another vehicle 10 to the corresponding ECUs 30 and 31 via the gateway 20. The TCU 50 transmits information transmitted from the ECUs 30 and 31 via the gateway 20 to an external device or another vehicle 10.

Further, the TCU 50 transmits information transmitted from the gateway 20 to the management server 100, and transmits information transmitted from the management server 100 to the gateway 20.

The TCU 50 and the gateway 20 may be connected via a dedicated communication line in addition to being connected via the communication bus 42.

Further, the gateway 20 has a port (not shown) via which a diagnostic device (not shown) is connected from the outside of a vehicle. The diagnostic device communicates with the ECUs 30 and 31 via the communication buses 40 and 41. The diagnostic device collects diagnostic data on control operations from the ECUs 30 and 31, and transmits diagnostic information such as measurement parameters necessary for collecting diagnostic data to the ECUs 30 and 31. The diagnostic device may be configured to communicate with the ECUs 30 and 31 via the TCU 50.

Channel numbers are given to the communication buses 40, 41, and 42 and the port for the diagnostic device in the gateway 20 for identification.

In FIG. 2, the gateway 20 includes a CPU 21, a memory 22, a storage unit 23, and a plurality of communication units 24.

The CPU 21 reads various computer programs stored in the memory 22 and the like and executes various instructions included in the programs. By executing the programs, the CPU 21 functions as a plurality of information processing circuits in the gateway 20. While the present embodiment shows an example of realizing the plurality of information processing circuits of the gateway 20 by software, it is also possible to configure each information processing circuit by preparing dedicated hardware for performing each item of information processing shown below. Further, the plurality of information processing circuits may be configured by individual pieces of hardware.

The CPU 21 includes, as a plurality of information processing circuits, a processing unit 21a, a detecting unit 21b, a detailed information generating unit 21c, a summary information generating unit 21d, and a reading unit 21e. The processing unit 21a mainly has specific functions as the gateway 20, and the detecting unit 21b, the detailed information generating unit 21c, the summary information generating unit 21d, and the reading unit 21e function as abnormality detecting devices.

The processing unit 21a transfers communication data between the ECU 30 connected to the communication bus 40 and the ECU 31 connected to the communication bus 41. Further, the processing unit 21a transfers data between the ECUs 30 and 31 connected to the communication buses 40 and 41, and the TCU 50 connected to the communication bus 42.

The processing unit 21a communicates in accordance with communication data specified in a CAN communication protocol. The communication data is constituted by a plurality of frames. Each frame is constituted by various fields such as IDs and data fields, and each field stores an ID (CAN ID) which is a value indicating a type of data and data.

The detecting unit 21b detects an abnormality occurred in an in-vehicle network. There is a possibility that an illegal attack occurs in an in-vehicle network constructed in each vehicle 10 via the TCU 50, a malfunction diagnosis port, a system uniquely having a communication function such as a navigation system, and the like. The detecting unit 21b detects a security abnormality such as a violation associated with an attack on an in-vehicle network.

The detailed information generating unit 21c generates detailed information indicating details of contents of an abnormality. The detailed information generating unit 21c records the generated detailed information in the storage unit 23. The detailed information generating unit 21c transmits the detailed information to the management server 100 by outputting the detailed information to the TCU 50 by means of the control by the reading unit 21e.

The summary information generating unit 21d generates summary information based on the detailed information stored in the storage unit 23. The summary information generating unit 21d may record the generated summary information in the storage unit 23. The summary information corresponds to information in which contents of an abnormality are more summarized than those in the detailed information. The summary information generating unit 21d transmits the summary information to the management server 100 by outputting the summary information to the TCU 50 by means of control by the reading unit 21e.

The reading unit 21e reads all or part of necessary information (examples: detailed information, summary information, and the like) from the storage unit 23 or the like at an appropriate timing depending on a situation. The reading unit 21e may read summary information by causing the summary information generating unit 21d to generate the summary information depending on a situation. The reading unit 21e outputs the read information to the TCU 50 to transmit the information to the management server 100.

As a specific example of transmission depending on a situation, the reading unit 21e determines the data amount and/or timing to be used for communication with the management server 100, based on a priority according to a type, contents, number of times, a frequency, a tendency, the amount of detection, the degree of influence, and/or the degree of risk of the detected abnormality. The reading unit 21e may further determine the data amount and/or timing based on a priority according to at least one of the capacity (example: the remaining capacity) of the storage unit 23, a previously notified timing, and a frequency, in addition to the above. As a result, the reading unit 21e can transmit information to the management server 100 by outputting information read to the TCU 50 at the determined data amount and/or timing. The reading unit 21e may control the data amount and/or notification timing of an abnormality notification (example: violation notification) indicating that an abnormality has occurred, in addition to information (log) indicating contents of an abnormality. As an example, a storage destination and a holding destination of each information and priority rule may be as follows.

The following is determined by the detecting unit 21b and recorded as detailed information, a part thereof is recorded as summary information, and the following is used by the reading unit 21e.

Type of abnormality
Contents (detection)
Frequency (detection)
Tendency (detection)
Amount of detection
Degree of influence
Degree of risk
The following is held by the reading unit 21e.
Previously notified timing
Frequency (of past notification)
Priority rule
The reading unit 21e may delete all or part of information stored in the storage unit 23, if the reading unit 21e receives a deletion instruction based on an abnormality notification or information transmission from the management server 100, or if the reading unit 21e successfully performs the abnormality notification or information communication to the management server 100. In other words, the reading unit 21e may control contents recorded in the storage unit 23 (which of detailed information and summary information is left as a log, and the like) depending on a situation. Accordingly, while providing the necessary notification and information to the management server 100, it is possible to suppress information leakage associated with an attack on an in-vehicle network. Alternatively, the limited storage capacity can be effectively utilized to store appropriate information as a log depending on a situation.

As a specific example of a priority, a priority may be the degree of influence on a system based on the degree of security violation or the degree of gradually increasing risk from the history of the number of times a security violation signal has been acquired when a security violation signal is detected as an abnormality from the acquired data by the detecting unit 21b. The reading unit 12e may perform control to increase the data amount required for communication to the management server 100 and/or advance a timing of notification to the management server 100, as the degree of influence increases, that is, as a priority increases.

In addition, for the degree of influence/priority, processing below may be performed according to a threshold value, for example. If the degree of influence/priority is more than a first prescribed value as a first threshold value, only a type of security violation signal, a frequency of notification, or the amount of detection may be communicated/transmitted. Further, if the degree of influence/priority is more than a second prescribed value which is larger than the first prescribed value and is as a second threshold value, contents or the transmission destination of a data frame including a security violation signal may be further communicated/transmitted. Furthermore, if the degree of influence/priority is more than a third prescribed value which is larger than the second prescribed value and is as a third threshold value, the entire acquired data frame may be communicated/transmitted. In addition, a threshold value regarding the time or the number of times may be provided, and if security violation signals are continuously acquired for a prescribed period of time or if a prescribed number of security violation signals or more are acquired, a communication sequence may be communicated/transmitted in addition to the acquired data frame. In addition, if the degree of influence/priority is more than a fourth prescribed value which is larger than the third prescribed value and is as a fourth threshold value, a data frame from another vehicle-mounted equipment or a status of a vehicle may be communicated/transmitted.

As a premise of the present embodiment, the following may be assumed. That is, the CPU 21 such as the reading unit 21e transmits a summary (summary information) such as the abnormality detection type as a periodic notification. The CPU 21 transmits detailed information (counters, detected frames, and the like) in a state where Ethernet communication is enabled, if an abnormality is initially detected, a certain period of time has elapsed from a previous notification, or the log retention amount is a certain amount or more. After the detailed information (detailed log) is notified, the CPU 21 may delete the log and control the data retention amount.

The storage unit 23 stores various pieces of information. For example, the storage unit 23 stores detailed information generated by the detailed information generating unit 21c. The storage unit 23 may store summary information generated by the summary information generating unit 21d. As a specific example, the storage unit 23 stores detailed information for each abnormality detected by the detecting unit 21*b*. For each abnormality detected by the detecting unit 21*b*, an abnormality ID for identifying the abnormality is associated with each piece of detailed information.

The storage unit 23 may be capable of recording logs using a multilayer buffer. For example, the following two types of buffers may be possible.

High priority buffer: A buffer that sufficiently stores information and can be deleted after notification to the management server 100. This high priority buffer has a large influence on safety and may be referred to as a write type or IDPS. The buffer may or may not record logs related to IDPS.

Casual buffer: A buffer that can overwrite data, has a small influence on safety, and may be referred to as a read type or IDS. The buffer may or may not record logs related to IDS.

A plurality of communication units 24, 25 and 26 are provided in correspondence with the plurality of communication buses 40, 41, and 42 and are connected to the communication buses 40, 41, and 42. The individual communication units 24, 25 and 26 receive frames from the communication buses 40, 41, and 42 according to a CAN communication protocol and temporarily store the received frames (reception frames). The reception frames stored in the individual communication units 24, 25 and 26 are read by the CPU 21. The individual communication units 24, 25 and 26 store frames to be transmitted (transmission frames) input from the CPU 21 to the communication units 24, 25 and 26. The individual communication units 24, 25 and 26 transmit the stored transmission frames according to a CAN communication protocol.

The management server 100 is mainly constituted by a computer 110 and a storage device 120. In the present embodiment, the management server 100 realizes a Security Operation Center that collects, monitors, and analyzes information on security violation against a vehicle as much as possible.

The computer 110 is constituted by one or more computers having a CPU and a memory. The computer 110 manages an abnormality occurred in an in-vehicle network, based on data received from each vehicle 10 via the external network 200 (controller). Examples of the management performed by the computer 110 includes abnormality analysis, real-time monitor, feedback for next development, defense report, and incident report. The computer 110 provides these kinds of functions by executing a prescribed program.

A CPU reads various computer programs stored in a memory and executes various instructions included in the programs. By executing the programs, the CPU realizes a plurality of functions of the management server 100. The present embodiment shows an example in which the functions of the management server 100 are realized by software. However, it is also possible to configure each information processing circuit by preparing dedicated hardware for performing functions described below.

In the present embodiment, the computer 110 acquires information such as violation notification from the gateway 20 and stores the information in the storage device 120. The computer 110 may determine whether detailed information is necessary, based on the violation information received from the gateway 20, and may transmit a transmission request of detailed information to the gateway 20 if the computer 110 determines that detailed information is necessary. After detailed information is transmitted from the gateway 20 in response to the request, the computer 110 can receive detailed information. If the reading unit 21*e* determines to transmit detailed information depending on a situation/priority as described above, detailed information is transmitted from the gateway 20 to the computer 110 from the beginning.

Information received from each vehicle 10 via the external network 200 is recorded in the storage device 120. Specifically, violation notification (may include summary information), summary information, detailed information, and the like are recorded in the storage device 120.

A flow of processing in the security system will be described below with reference to FIGS. 4, 5, 6A, and 6B.

Figure 4:
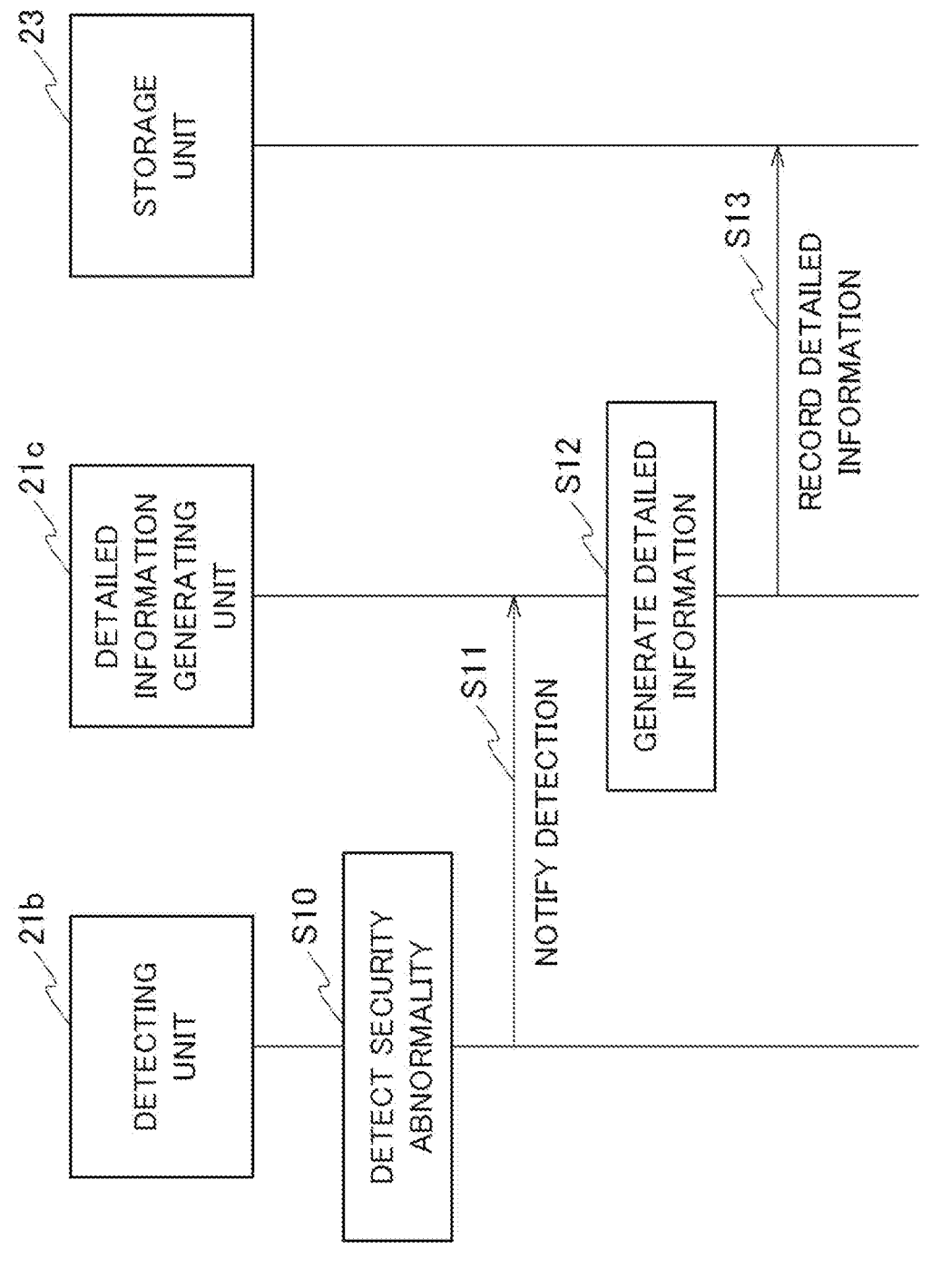
FIG. 4 is an explanatory diagram showing a procedure of processing of detailed information.

A flow of processing of detailed information will be described with reference to FIG. 4. First, the detecting unit 21*b* detects an abnormality occurred in the in-vehicle network, specifically, a security abnormality (S10). Examples of the security abnormality includes a CANID abnormality, a data amount abnormality, a data value abnormality, and the like.

The CANID abnormality is an abnormality in a CANID, for example, and corresponds to a case in which a CANID which is not planned to be used in the in-vehicle network is used. The data amount abnormality is an abnormality related to the amount of communication data flowing through the communication buses 40, 41, and 42. For example, if the amount of frames flowing per unit of time is larger than a prescribed reference value, it is determined that the data amount abnormality occurs. Further, it is assumed that the same type of frames flow at fixed periods. Therefore, if the same type of frames do not flow at fixed periods, it is determined that the data amount abnormality occurs. Furthermore, the data value abnormality is an abnormality related to values of communication data flowing through the communication buses 40, 41, and 42. The same type of frames are assumed to have continuity in the data content. Therefore, if there is a frame having a data value which is largely different from a data value of an immediately preceding frame, it is determined that the data value abnormality occurs.

After detecting a security abnormality, the detecting unit 21*b* notifies the detailed information generating unit 21*c* of the detection (S11).

The detailed information generating unit 21*c* generates detailed information indicating details of contents of an abnormality, based on the abnormality detected by the detecting unit 21*b* (S12). As an example, the detailed information may include type information, part information, timing information, state information, target data information, detection amount information, and the like. The detailed information is constituted by, for example, 25 K bytes of data.

As an example, the type information is information indicating types of abnormalities, and abnormality types such as a CANID abnormality, data amount abnormality, and data value abnormality are described. As an example, the part information is information indicating a part where an abnormality is detected, and a channel where an abnormality is detected is described. As an example, the timing information is information indicating a timing when an abnormality is detected, and an elapsed time from a timing when the gateway 20 is started for the first time to the detection of an abnormality, a travel distance at the detected timing, or the like is described. The gateway 20 operates in a plurality of different operation modes, and as an example, the state information is information indicating an operation mode the gateway 20 when an abnormality is detected. As an example, the target data information is data itself included in a frame in which an abnormality is detected. As an example, the detection amount information is information indicating the total amount of abnormalities that have been detected so far. The detecting unit 21*b* has a counter for measuring the number of detections for each abnormality type, and a count value of each counter is described in the detection information.

After generating detailed information, the detailed information generating unit 21*c* performs format conversion to record the information in the storage unit 23. Then, the detailed information generating unit 21*c* records the detailed information in the storage unit 23 (S13). At this time, the detailed information generating unit 21*c* associates an abnormality ID for identifying an abnormality detected by the detecting unit 21*b* with the detailed information and records the resulting detailed information.

Figure 5:
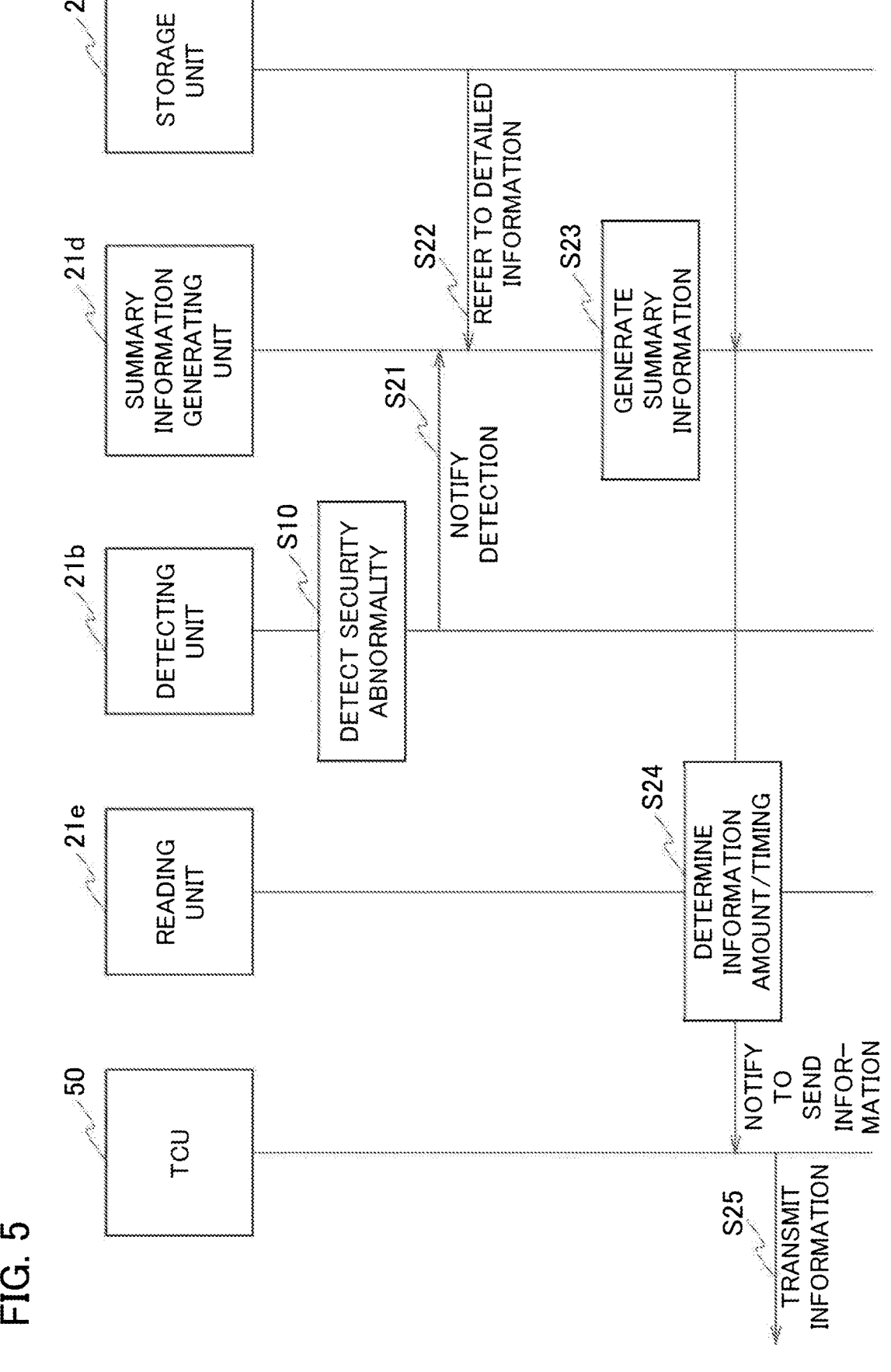
FIG. 5 is an explanatory diagram showing a procedure of processing of summary information.

With reference to FIG. 5, a flow of processing of summary information will be described. First, the detecting unit 21*b* detects an abnormality occurred in the in-vehicle network, specifically, a security abnormality or an in-vehicle network violation (S10). Then, the detecting unit 21*b* notifies the summary information generating unit 21*d* of the detection (S21).

The summary information generating unit 21*d* refers to the detailed information recorded by the detailed information generating unit 21*c* in the storage unit 23 (S22). The summary information generating unit 21*d* generates, based on information extracted from the detailed information, summary information in which contents of an abnormality are more summarized than those in the detailed information (S23).

The summary information is constituted by 8 bytes corresponding to a data field of one frame, and is constituted with the data amount which is smaller than that of the detailed information, for example. The summary information includes at least information based on which an abnormality type can be specified. Specifically, the summary information includes an abnormality type flag and an abnormality detection amount.

The abnormality type flag is a flag indicating whether an abnormality occurs in each channel for each abnormality type. The abnormality detection amount is information indicating the increase amount of all counters per unit of time.

The reading unit 21*e*, which will be described later, may determine the amount of data (example: detailed information or summary information) and/or a transmission timing based on a priority according to a type, contents, number of times, a frequency, a tendency, an amount of detection, the degree of influence, and the degree of risk of an abnormality detected by the detecting unit 21*b*, the capacity of the storage unit 23, a previously notified timing, a frequency, and the like. The reading unit 21*e* may determine whether to immediately transmit detailed information to the management server 100. Whether to transmit detailed information immediately is determined based on the detected abnormality type or the like, for example. In the case of an abnormality having a large influence on security, it is determined to transmit detailed information immediately, and in the case of an abnormality having a small influence on security, it is determined not to transmit detailed information immediately. The summary information includes an abnormality ID for specifying the corresponding detailed information.

After generating summary information, the summary information generating unit 21*d* outputs the detailed information from the storage unit 23 or the generated summary information to the TCU 50 in order to transmit information to the management server 100 by means of control according to the data amount and/or timing determined by the reading unit 21*e* (S24).

The TCU 50 transmits a violation notification including summary information or the like or detailed information to the management server 100 (S25). Specifically, the TCU 50 can transmit information to the management server 100 by means of control according to the data amount and/or timing determined by the reading unit 21*e*. The TCU 50 may hold the information until a timing such as a prescribed transmission cycle comes. After the transmission timing comes, the TCU 50 may transmit the information to the management server 100. The TCU 50 may give a vehicle ID for identifying each vehicle 10 to the information and transmit the resulting information.

After acquiring the information from the TCU 50, the computer 110 of the management server 100 determines whether detailed information is necessary if the information is summary information or violation information. An operator of the management server 100 analyzes summary information, violation notification, or the like, and determination as to whether detailed information is necessary may be made according to an operation by the operator based on the analysis result. In addition, the computer 110 may analyze summary information, violation notification, or the like, and in the case of information that satisfies a prescribed criterion (for example, corresponds to a specific abnormality type), the computer 110 may determine that detailed information thereof is necessary.

Figure 6A:
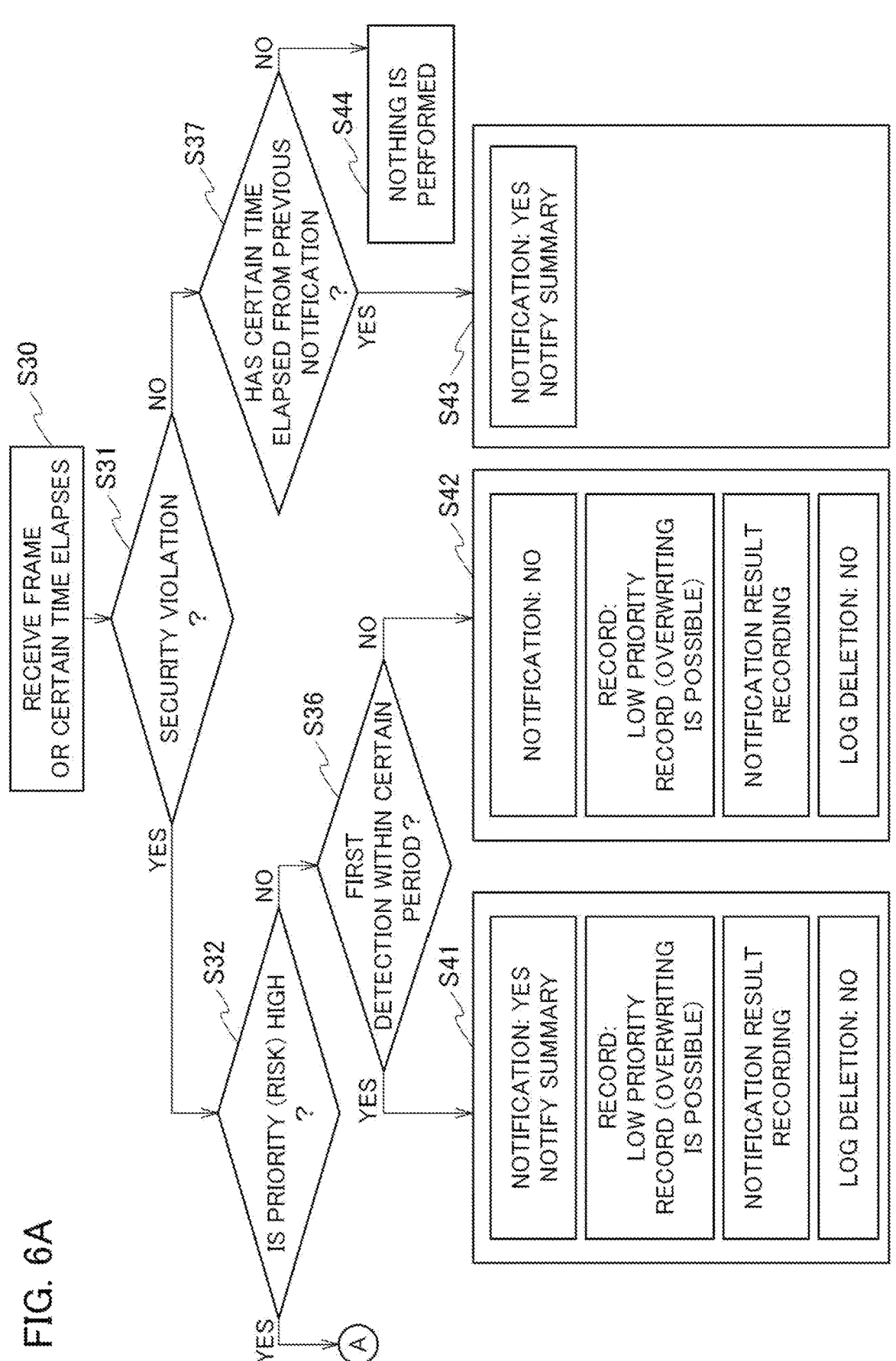
Figure 6B:
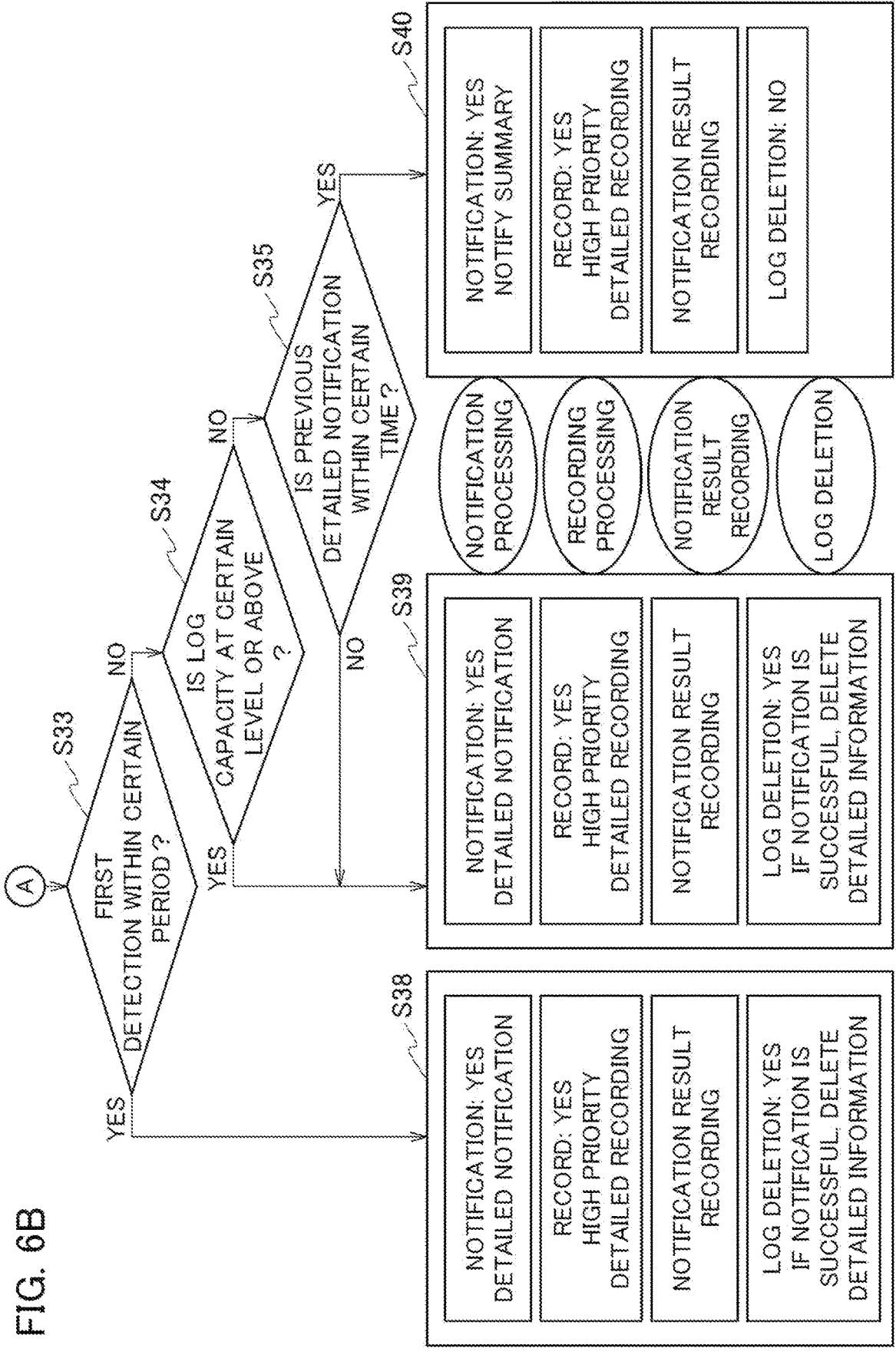

With reference to FIGS. 6A-6B, a flow of processing related to reading of information by the reading unit 21*e* will be described. As described above, the reading unit 21*e* determines an appropriate amount of data and timing according to a priority associated with a situation, and performs various processing as follows. As described in detail below, in summary, if the reading unit 21*e* receives a frame of information on an abnormality detected by the detecting unit 21*b*, or if a certain time has elapsed from the previous transmission (S30), the reading unit 21*e* performs a detection determination based on contents of an abnormality (S31), a priority (risk) determination based on the detection determination (S32), a determination of a frequency of abnormality detection (S33), a determination of the remaining capacity of the storage unit 23 (S34), an elapsed time determination (S35, S36, and S37), and the like, and performs notification processing, recording processing, notification result recording, log deletion, and the like in accordance with determination results thereof (S38 to S44).

More specifically, if an abnormality is not detected by the detecting unit 21*b* (S31, No), or if a certain time has elapsed from the previous notification (S37, Yes), the reading unit 21*e* outputs summary information to the TCU 50 to transmit the information to the management server 100 (S43). Meanwhile, if a certain time has not elapsed from the previous notification (S37, No), nothing is performed by the reading unit 21*e* (S44). As an example, the summary information may include information such as a type, detection/non-detection, ID, and diagnosis of an abnormality (violation), communication amount, authentication, and number of abnormalities detected within a certain time. Further, the detailed information may include information such as contents and IDs of individual detected abnormalities, frames, and when an abnormality is detected (date and time).

Further, if an abnormality is detected by the detecting unit 21*b* (S31, Yes), the reading unit 21*e* determines a priority (risk) according to an abnormality type, whether an abnormality is detected for the first time, a frequency of abnormality detection, the amount of detection, a tendency, and the like. (S32). For example, if a risk is low, the reading unit 21*e* flags a flag of a summary level and performs setting to notify only a type of abnormality detected statistically (S41 and S42). If an abnormality is detected for the first time within a certain period (S36, Yes), the reading unit 21*e* transmits summary information immediately (S41), and alternatively if an abnormality is not detected for the first time (S36, No), the reading unit 21*e* does not transmit summary information until a next transmission timing and performs setting to wait (S42). In the case of such low priority (S41 and S42), the reading unit 21*e* performs setting to allow overwriting of detailed information or the like, but the reading unit 21*e* does not perform active log deletion.

In this way, contents of information to be notified and a destination level can be changed according to a priority (risk). For example, in the case of single detection, control is performed to notify information with detailed content such as a frame itself and a timing when an abnormality is detected. In addition, for example, if a Safety level is high, if a Privacy level is higher than a medium level, and if a Financial level is higher than a medium level, the concentration of the information amount may be changed depending on the degree of importance. A level of continuous recording can also be changed depending on whether a priority (risk) is high or low. For example, the entire flow of consecutive frames may be continuously recorded or the number of channels (Chs) may be narrowed down and limited for recording, depending on whether a priority (risk) is high or low. In addition, a state of another ECU and a status of another vehicle may be notified depending on whether a priority (risk) is high or low.

In S32 of FIG. 6A, if it is determined that a priority (risk) is high (S32, Yes), if the abnormality is detected for the first time within a certain period (S33, Yes), or even if the abnormality is not detected for the first time within a certain period (S33, No), if the log capacity of the storage unit 23 is a certain level or above (S34, Yes), or even if the log capacity of the storage unit 23 is not a certain level or above (S34, No), and if a certain time has elapsed from the previous detailed notification (S34, No), the reading unit 21*e* performs setting to notify detailed information (S38 and S39). If a notification of detailed information is successful, the reading unit 21*e* performs setting to delete detailed information stored in the storage unit 23. Meanwhile, in a case other than the above, that is, even though it is determined that a priority (risk) is high (S32, Yes), the abnormality is not detected for the first time within a certain period (S33, No), the log capacity of the storage unit 23 is not a certain level or above (S34, No), and a certain time has not elapsed from the previous detailed notification (S35, Yes), the reading unit 21*e* performs setting to notify summary information, and performs setting to disallow the log deletion of detailed information stored in the storage unit 23 (S40).

If a priority is high and detailed recording is performed (S38 to S40), the reading unit 21*e* may control the perspective and amount of a log based on an abnormality type. In addition, information on ECUs of other vehicles such as what kind of ECUs they are and when they are used may also be recorded as necessary. All logs are taken for a while, the logs are transmitted together with information, and a frame and other details are recorded at first, but setting can be performed such that overwriting is possible if the same detection is performed multiple times.

As described above, according to the present embodiment, the reading unit 21*e* determines the data amount and/or timing to be used for communication with the management server 100, based on a priority according to a type, contents, number of times, a frequency, a tendency, an amount of detection, the degree of influence, and/or the degree of risk of the detected abnormality, and transmits information to the management server 100. According to this configuration, the reading unit 21*e* determines the amount and/or timing of notification of information indicating contents of an abnormality depending on a situation and transmits information to an external server, and accordingly it is possible to suppress disappearance of a log such as detailed information before notification to the external server.

In addition, according to the present embodiment, the reading unit 21*e* controls not only the data amount and/or notification timing of information (log) indicating contents of an abnormality, but also the data amount and/or notification timing of an abnormality notification indicating occurrence of an abnormality (example: violation notification). Therefore, it is possible to appropriately control the data amount and/or notification timing of information for notifying violation depending on a situation.

In addition, according to the present embodiment, the reading unit 21*e* performs control to transmit either summary information or detailed information according to the determined data amount. As a result, two different levels of information can be transmitted to the management server 100 in appropriate situations.

In addition, according to the present embodiment, by using the device for detecting an abnormality that is an external violation which is not a violation from vehicle-mounted equipment, when there is an external violation, it is possible to ensure security by leaving detailed information in the management server 100 and deleting a log of a host-vehicle.

In addition, according to the present embodiment, the reading unit 21*e* may delete all or part of information stored in the storage unit 23, if the reading unit 21*e* receives a deletion instruction based on an abnormality notification or information transmission from the management server 100, or if the reading unit 21*e* successfully performs the abnormality notification or information communication to the management server 100. In other words, the reading unit 21*e* may control contents recorded in the storage unit 23 (which of detailed information and summary information is left as a log, and the like) depending on a situation. Accordingly, while providing the necessary notification and information to the management server 100, it is possible to suppress information leakage associated with an attack on an in-vehicle network. Alternatively, the limited storage capacity can be effectively utilized to store appropriate information as a log depending on a situation.

In addition, according to the present embodiment, the reading unit 21*e* further determines the data amount and/or timing based on a priority according to the capacity (example: the remaining capacity) of the storage unit 23, a previously notified timing, and a frequency, in addition to the above. As a result, the reading unit 21*e* can transmit information to the management server 100 by outputting information read to the TCU 50 at the determined data amount and/or timing.

Further, according to the present embodiment, a priority is the degree of influence on a system based on the degree of security violation or the degree of gradually increasing risk from the history of the number of times a security violation signal has been acquired when a security violation signal is detected as an abnormality from the acquired data by the detecting unit 21*b*. Accordingly, it is possible to appropriately control the communication data amount and timing depending on a risk to a system according to contents and a tendency of a security violation signal.

In addition, according to the present embodiment, the reading unit 12e performs control to increase the data amount required for communication to the management server 100 and/or advance a timing of notification to the management server 100, as the degree of influence increases, that is, as a priority increases. Accordingly, if the degree of influence on a system is high and a risk is high, detailed information can be left to the management server 100 at an early timing.

Further, according to the present embodiment, a threshold value is set for the degree of influence/priority, and the following processing is performed. If the degree of influence/priority is more than a first prescribed value as a first threshold value, only a type of security violation signal, a frequency of notification, or the amount of detection may be communicated/transmitted. Further, if the degree of influence/priority is more than a second prescribed value which is larger than the first prescribed value and is as a second threshold value, contents or a transmission destination of a data frame including a security violation signal may be further communicated/transmitted. Furthermore, if the degree of influence/priority is more than a third prescribed value which is larger than the second prescribed value and is as a third threshold value, the entire acquired data frame may be communicated/transmitted. In addition, a threshold value regarding the time or the number of times may be provided, and if security violation signals are continuously acquired for a prescribed period of time or if a prescribed number of security violation signals or more are acquired, a communication sequence may be communicated/transmitted in addition to the acquired data frame. In addition, if the degree of influence/priority is more than a fourth prescribed value which is larger than the third prescribed value and is as a fourth threshold value, a data frame from another vehicle-mounted equipment or a status of a vehicle may be communicated/transmitted. In this way, by setting an appropriate threshold value according to a risk to a system, security can be appropriately enhanced by performing simple determination processing.

In the present embodiment, the CPU 21 of the gateway 20 transmits summary information at a timing when an abnormality occurred in the in-vehicle network is detected. However, the CPU 21 may transmit summary information at any timing at or after a timing when an abnormality is detected.

Further, in the present embodiment, the gateway 20 has functions specific to the gateway and functions of the abnormality detecting device. In this case, since an abnormality can be detected at an entrance/exit of the in-vehicle network, a security abnormality can be detected at an early stage.

Figure 7:
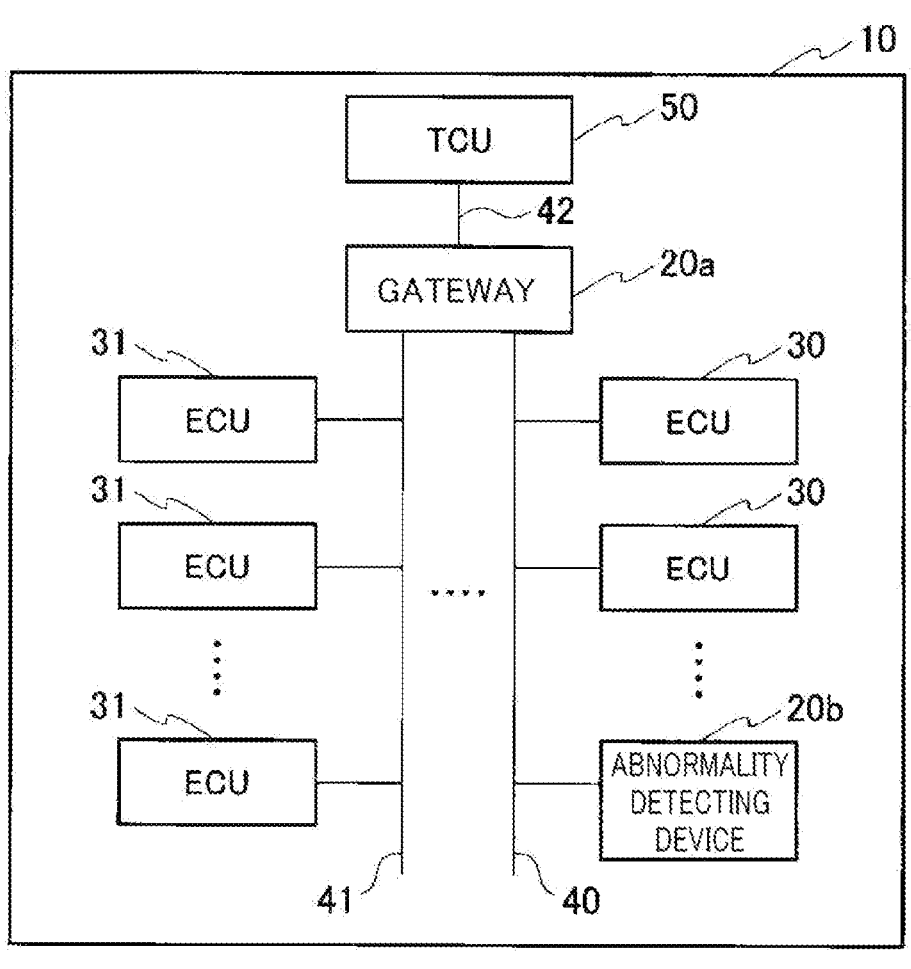
FIG. 7 is a block diagram showing a configuration of a vehicle according to a modified example.

However, an abnormality detecting device may be provided in the in-vehicle network independently from the gateway 20. For example, in FIG. 7, the gateway 20a has only a function of the processing unit 21a, and an abnormality detecting device 20b has functions of the detecting unit 21b, the detailed information generating unit 21c, the summary information generating unit 21d, and the reading unit 21e. In addition, all of the detecting unit 21b, the detailed information generating unit 21c, the summary information generating unit 21d, and the reading unit 21e do not need to be constituted by one hardware resource, but may be constituted by a plurality of hardware resources.

Further, in the present embodiment, communication with the management server 100 is realized using the TCU 50. However, the communication method with the management server 100 is not limited thereto. For example, the gateway 20 may be connected to a communication adapter used for performing wireless communication such as Wi-Fi (registered trademark). If a system (for example, navigation system) connected to the in-vehicle network is connected to a communication terminal such as a mobile phone or a smartphone by means of wireless communication or wired communication, a communication function of the communication terminal may be used. If a diagnostic device connected to a malfunction diagnosis port has a communication function, the communication function of the diagnostic device may be used.

In addition, the gateway 20 may display information indicating that an abnormality has been detected by using a meter unit or an information providing device connected via the in-vehicle network. The information to be displayed may be a diagram or symbol for notifying an abnormality detection, or may be a character, diagram, or symbol indicating a type of abnormality.

Although an embodiment of the present invention has been described as above, it should not be understood that the statements and drawings which form part of this disclosure are intended to limit the invention. Various alternative embodiments, examples, and operating techniques will become apparent to those skilled in the art from this disclosure.

REFERENCE SIGNS LIST

10 Vehicle
20 Gateway
21 CPU (controller)
21a Processing unit
21b Detecting unit
21c Detailed information generating unit
21d Summary information generating unit
21e Reading unit
22 Memory
23 Storage unit (storage device)
24, 25, 26 Communication unit
30, 31 ECU
40, 41, 42 Communication bus
50 TCU (communication device)
100 Management server
110 Computer (controller)
120 Storage device

The invention claimed is:

1. An abnormality detecting device comprising:
a controller for detecting an abnormality occurred in an in-vehicle network in which a plurality of pieces of vehicle-mounted equipment mounted in a vehicle communicate with each other; and
a storage device for storing information,
wherein the controller:
   determines a data amount and/or a timing to be used for communication with an external device, based on a priority that is a degree of influence on a system based on a degree of security violation or a degree of gradually increasing risk from a history of the number of times a security violation signal has been acquired when the security violation signal is detected as the abnormality from acquired data;
   generates detailed information, indicating contents of the abnormality, and summary information in which the contents of the abnormality are more summarized than those in the detailed information;

stores the detailed information and the summary information in the storage device;

upon the priority being more than a first threshold value and upon the abnormality being detected for a first time in a first time period, performs a notification of the detailed information to the external device and deletes the detailed information stored in the storage device after performing the notification;

upon the priority being more than the first threshold value and upon the abnormality not being detected for a first time in the first time period and upon a log capacity of the storage device being at or above a certain level, performs a notification of the detailed information to the external device and deletes the detailed information stored in the storage device after performing the notification;

upon the priority being more than the first threshold value and upon the abnormality not being detected for a first time in the first time period and upon the log capacity of the storage device not being at or above the certain level and upon a certain time having elapsed since a previous notification of the detailed information, performs a notification of the detailed information to the external device and deletes the detailed information stored in the storage device after performing the notification; and upon the priority being more than the first threshold value and upon the abnormality not being detected for a first time in the first time period and upon the log capacity of the storage device not being at or above the certain level and upon the certain time not having elapsed since a previous notification of the detailed information, performs a notification of the summary information to the external device and disallows deletion of a log of the detailed information stored in the storage device.

2. The abnormality detecting device according to claim 1, wherein the controller transmits, as the communication with the external device, an abnormality notification and/or all or a part of the information stored in the storage device to the external device according to the data amount and/or the timing.

3. The abnormality detecting device according to claim 2, wherein the controller reads the detailed information or the summary information from the storage device and transmits the detailed information or the summary information to a management server as the external device that is provided outside the vehicle and manages the abnormality occurred in the in-vehicle network according to the data amount.

4. The abnormality detecting device according to claim 1, wherein the abnormality is an external violation that is not a violation from the vehicle-mounted equipment.

5. The abnormality detecting device according to claim 1, wherein the controller further determines the data amount and/or the timing based on the priority according to at least one of a capacity of the storage device, a previously notified timing, and a frequency.

6. The abnormality detecting device according to claim 1, wherein the controller increases a data amount required for communication with the external device and/or advances a timing of notification to the external device, as the priority increases.

7. The abnormality detecting device according to claim 1, wherein the controller:

communicates contents or a transmission destination of a data frame including the security violation signal when the priority is more than the first threshold value; and communicates only a type of the security violation signal, a frequency of notification, or an amount of detection when the priority is more than a second threshold value that is smaller than the first threshold value.

8. The abnormality detecting device according to claim 1, wherein the controller:

communicates contents or a transmission destination of a data frame including the security violation signal when the priority is more than the first threshold value; and communicates an entire acquired data frame, when the priority is more than a third threshold value that is larger than the first threshold value.

9. The abnormality detecting device according to claim 1, wherein the controller communicates a communication sequence in addition to the acquired data frame, when the security violation signal is continuously acquired for a prescribed period of time or is acquired a prescribed number of times or more.

10. The abnormality detecting device according to claim 8, wherein the controller communicates a data frame from another vehicle-mounted equipment or a status of a vehicle, when the priority is more than a fourth threshold value that is larger than the third threshold value.

11. A security system comprising:

a vehicle constructed with an in-vehicle network in which a plurality of pieces of vehicle-mounted equipment communicate with each other; and a management server for communicating with the vehicle, wherein the vehicle includes an abnormality detecting device having a controller for detecting an abnormality occurred in the in-vehicle network and a storage device for storing information, wherein the controller of the abnormality detecting device;

determines a data amount and/or a timing to be used for communication with an external device, based on a priority that is a degree of influence on a system based on a degree of security violation or a degree of gradually increasing risk from a history of the number of times a security violation signal has been acquired when the security violation signal is detected as the abnormality from acquired data;

generates detailed information, indicating contents of the abnormality, and summary information in which the contents of the abnormality are more summarized than those in the detailed information;

stores the detailed information and the summary information in the storage device;

upon the priority being more than a first threshold value and upon the abnormality being detected for a first time in a first time period, performs a notification of the detailed information to the external device and deletes the detailed information stored in the storage device after performing the notification;

upon the priority being more than the first threshold value and upon the abnormality not being detected for a first time in the first time period and upon a log capacity of the storage device being at or above a certain level, performs a notification of the detailed information to the external device and deletes the detailed information stored in the storage device after performing the notification;

upon the priority being more than the first threshold value and upon the abnormality not being detected for a first time in the first time period and upon the log capacity of the storage device not being at or above the certain level and upon a certain time having elapsed since a previous notification of the detailed information, performs a notification of the detailed information to the external device and deletes the detailed information stored in the storage device after performing the notification; and upon the priority being more than the first threshold value and upon the abnormality not being detected for a first time in the first time period and upon the log capacity of the storage device not being at or above the certain level and upon the certain time not having elapsed since a previous notification of the detailed information, performs a notification of the summary information to the external device and disallows deletion of a log of the detailed information stored in the storage device, wherein the management server includes a controller for managing the abnormality occurred in the in-vehicle network, and wherein the controller of the management server communicates with the abnormality detecting device.

12. An abnormality notification method performed by an abnormality detecting device including a controller for detecting an abnormality occurred in an in-vehicle network in which a plurality of pieces of vehicle-mounted equipment mounted in a vehicle communicate with each other, and a storage device for storing information, the abnormality notification method comprising:

the controller determining a data amount and/or a timing to be used for communication with an external device, based on a priority that is a degree of influence on a system based on a degree of security violation or a degree of gradually increasing risk from a history of the number of times a security violation signal has been acquired when the security violation signal is detected as the abnormality from acquired data;

the controller generating detailed information, indicating contents of the abnormality, and summary information in which the contents of the abnormality are more summarized than those in the detailed information;

the controller storing the detailed information and the summary information in the storage device;

upon the priority being more than a first threshold value and upon the abnormality being detected for a first time in a first time period, the controller performs a notification of the detailed information to the external device and deletes the detailed information stored in the storage device after performing the notification;

upon the priority being more than the first threshold value and upon the abnormality not being detected for a first time in the first time period and upon a log capacity of the storage device being at or above a certain level, the controller performs a notification of the detailed information to the external device and deletes the detailed information stored in the storage device after performing the notification;

upon the priority being more than the first threshold value and upon the abnormality not being detected for a first time in the first time period and upon the log capacity of the storage device not being at or above the certain level and upon a certain time having elapsed since a previous notification of the detailed information, the controller performs a notification of the detailed information to the external device and deletes the detailed information stored in the storage device after performing the notification; and upon the priority being more than the first threshold value and upon the abnormality not being detected for a first time in the first time period and upon the log capacity of the storage device not being at or above the certain level and upon the certain time not having elapsed since a previous notification of the detailed information, the controller performs a notification of the summary information to the external device and disallows deletion of a log of the detailed information stored in the storage device.

* * * * *